United States Patent
Guo et al.

(10) Patent No.: US 9,135,723 B1
(45) Date of Patent: Sep. 15, 2015

(54) EFFICIENT VISUALLY LOSSLESS COMPRESSION

(71) Applicant: MARVELL INTERNATIONAL LTD., Hamilton (BM)

(72) Inventors: Zhiying Guo, Sammamish, WA (US); Yun Gong, Cupertino, CA (US); Dam LeQuang, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/134,285

(22) Filed: Dec. 19, 2013

Related U.S. Application Data

(60) Provisional application No. 61/739,400, filed on Dec. 19, 2012.

(51) Int. Cl.
| | |
|---|---|
| G06K 9/36 | (2006.01) |
| G06T 9/00 | (2006.01) |
| H04N 19/146 | (2014.01) |
| H04N 19/124 | (2014.01) |

(52) U.S. Cl.
CPC .............. *G06T 9/00* (2013.01); *H04N 19/0009* (2013.01); *H04N 19/00169* (2013.01)

(58) Field of Classification Search
USPC ........................................................ 382/244
See application file for complete search history.

(56) References Cited

U.S. PATENT DOCUMENTS

| | | | | |
|---|---|---|---|---|
| 8,363,969 | B1* | 1/2013 | Wang et al. | 382/251 |
| 8,472,731 | B2* | 6/2013 | Suzuki et al. | 382/232 |
| 8,891,619 | B2* | 11/2014 | Leontaris et al. | 375/240.12 |

OTHER PUBLICATIONS

Dung T. Vo and Yeong-Taeg Kim, "Low Line Memory Visually Lossless Compression for Color Images Using Non-Uniform Quantizers," IEEE Transactions on Consumer Electronics, Feb. 2011 (pp. 187-195).

Han Oh, Ali Bilgin and Michael W. Marcellin, "Visually Lossless Encoding for JPEG2000," IEEE Transactions on Image Processing, Jan. 2013 (pp. 189-201).

Rani, et al., Visually Lossless Compression for Color Images with Low Memory Requirement using Lossless Quantization, International Journal of Soft Computing and Engineering, 2012 (pp. 156-159).

(Continued)

*Primary Examiner* — Yon Couso

(57) ABSTRACT

Systems, methods, and other embodiments associated with efficient visually lossless compression are described. According to one embodiment, an apparatus includes a transform logic configured to receive image data divided into segments and generate a matrix of transform coefficients corresponding to a segment. The apparatus also includes a rate control logic configured to select (i) a set of quantization levels from a plurality of sets of quantization levels and (ii) a quantization level from the selected set of quantization levels based, at least in part, on a desired visual quality. Each set of quantization levels corresponds to a different target compression ratio for the image data. The apparatus further includes a quantization logic configured to quantize the matrix of transform coefficients according to the selected quantization level to produce an array of integers. The apparatus also includes an encoding logic configured to encode the array of integers as a bit stream.

20 Claims, 8 Drawing Sheets

(56) References Cited

OTHER PUBLICATIONS

Marcelo J. Weinberger, Gadiel Seroussi and Guillermo Sapiro, The Loco-I Lossless Image Compression Algorithm: Principles and Standardization into JPEG-LS, IEEE Transactions on Image Processing, Aug. 2000 (pp. 1309-1324).

Paul G. Howard and Jeffrey Scott Vitter, Fast and Efficient Lossless Image Compression, Proceedings of the 1993 IEEE Data Compression Conference (DDC 1993) (pp. 351-360).

* cited by examiner

|   |   |   |   |
|---|---|---|---|
| A | E | F | G |
| B | H | I | K |
| C | J | M | N |
| D | L | O | P |

|   |   |   |   |
|---|---|---|---|
| 1 | 2 | 2 | 2 |
| 1 | 2 | 2 | 2 |
| 1 | 2 | 2 | 2 |
| 1 | 2 | 2 | 2 |

201

|   |   |   |   |
|---|---|---|---|
| 1 | 2 | 2 | 2 |
| 2 | 4 | 4 | 8 |
| 2 | 4 | 8 | 8 |
| 2 | 8 | 8 | 8 |

202

|   |   |   |   |
|---|---|---|---|
| 1 | 4 | 4 | 4 |
| 2 | 4 | 4 | 8 |
| 2 | 4 | 8 | 8 |
| 2 | 8 | 8 | 8 |

203

|   |   |   |   |
|---|---|---|---|
| 2 | 4 | 4 | 4 |
| 4 | 8 | 8 | 8 |
| 4 | 8 | 8 | 8 |
| 4 | 8 | 8 | 8 |

204

|   |   |   |   |
|---|---|---|---|
| 2 | 4 | 4 | 4 |
| 4 | 8 | 8 | 16 |
| 4 | 8 | 16 | 16 |
| 4 | 16 | 16 | 16 |

205

|   |   |   |   |
|---|---|---|---|
| 2 | 8 | 8 | 8 |
| 8 | 8 | 8 | 16 |
| 8 | 8 | 16 | 16 |
| 8 | 16 | 16 | 16 |

206

|   |   |   |   |
|---|---|---|---|
| 4 | 8 | 8 | 8 |
| 8 | 16 | 16 | 32 |
| 8 | 16 | 32 | 32 |
| 8 | 32 | 32 | 32 |

207

|   |   |   |   |
|---|---|---|---|
| 8 | 16 | 16 | 16 |
| 16 | 32 | 32 | 64 |
| 16 | 32 | 64 | 64 |
| 16 | 64 | 64 | 64 |

# EFFICIENT VISUALLY LOSSLESS COMPRESSION

CROSS REFERENCE TO RELATED APPLICATIONS

This patent disclosure claims the benefit of U.S. Provisional Application Ser. No. 61/739,400 filed on Dec. 19, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Image and video compression are widely used in many applications. Compression methods are classified based on an amount of distortion between compressed data and the original source of the compressed data. Compression methods are typically classified as lossy, visually lossless, and lossless. Lossy compression has a high compression ratio but suffers from distortion due to information loss during compression. Lossless compression has virtually no information loss, but has a limited compression ratio. Visually lossless compression tolerates information loss that would not be evident to the human eye and therefore can manage a higher compression ratio than lossless compression. Visually lossless or lossless compression is required in fields that tolerate little or no information loss. For instance, lossless compression is often necessary for medical imaging. Applications that require a fixed low compression ratio and little information loss typically employ visually lossless compression.

Image and video processing systems store uncompressed images in memories for later processing. As image sizes grow, the increasing amount of memory required to store uncompressed images becomes unfeasible. Compression methods must balance the amount of storage necessary to store the data of an image with the data loss resulting from compression. When images are compressed, the image as a whole is often subject to the same compression ratio even though portions of the image may be more or less susceptible to compression. For example, portions of the image having a high frequency variation will suffer more data loss in compression than portions having a low frequency variation.

SUMMARY

In general, in one aspect this specification discloses an apparatus. The apparatus includes a transform logic configured to receive image data divided into segments and generate a matrix of transform coefficients corresponding to a segment. The apparatus also includes a rate control logic configured to select (i) a set of quantization levels from a plurality of sets of quantization levels and (ii) a quantization level from the selected set of quantization levels based, at least in part, on a desired visual quality. Each set of quantization levels corresponds to a different target compression ratio for the image data. A quantization level comprises a matrix of divisors to be applied to corresponding transform coefficients in the matrix of transform coefficients. The apparatus further includes a quantization logic configured to quantize the matrix of transform coefficients according to the selected quantization level to produce an array of integers. The apparatus also includes an encoding logic configured to encode the array of integers as a bit stream.

The apparatus further includes a scan order logic configured to reorder the transform coefficients before the matrix of transform coefficients is quantized according to the selected quantization level. The transform coefficients are reordered to place the transform coefficients in order of decreasing impact to visual quality of the image data.

In one embodiment, the divisors are integer values that are powers of two. In another embodiment, the divisors of the quantization level may be comprised of at least two different integer values.

In one embodiment, the quantization logic is further configured to receive a bit budget for the segment. The bit budget is based, at least in part, on the desired visual quality. In this embodiment, the rate control logic is further configured to iteratively select different quantization levels until the number of bits in the bit stream does not exceed the bit budget.

In another embodiment the encoding logic includes and alternating current (AC) logic configured to encode values in the array of integers according to variable length coding tables.

In general, in another aspect, this specification discloses a method for efficient visually lossless compression. The method includes generating a matrix of transform coefficients by applying a transform to a segment of image data. The method further includes selecting a set of quantization levels from a plurality of sets of quantization levels based, at least in part, on a target compression ratio for the image data. The method includes selecting a quantization level from the selected set of quantization levels based, at least in part, on a desired visual quality. Each set of quantization levels corresponds to a different target compression ratio for the image data. Each quantization level comprises a matrix of divisors to be applied to corresponding transform coefficients in the matrix of transform coefficients. The method further includes quantizing the matrix of transform coefficients according to the selected quantization level for the segment by applying the divisors in the selected quantization level to the transform coefficients to produce an array of integers. The method includes encoding the array of integers as a bit stream.

In one embodiment, the method includes reordering transform coefficients of the matrix of transform coefficients before the matrix of transform coefficients is quantized. The transform coefficients are reordered to place the transform coefficients in order of decreasing impact to visual quality of the image data.

In one embodiment, the transform logic performs a wavelet transformation on the segment to generate the matrix of transform coefficients.

In another embodiment, the method includes determining whether the bit stream exceeds a bit budget and selecting a next quantization level having a higher compression ratio for the segment when the bit stream exceeds the bit budget. The bit budget is based, at least in part, on the desired visual quality. The method may include truncating the bit stream to meet the bit budget when the bit stream exceeds the bit budget and the selected quantization level represents the highest compression ratio.

In general, in another aspect, this specification discloses a device for efficient visually lossless compression. The device includes a non-volatile storage medium. The non-volatile storage medium stores at least a first set of quantization levels and a second set of quantization levels. Each set of quantization levels comprises at least one quantization level. Each set of quantization levels corresponds to a target compression ratio for an image. The device also includes a transform logic configured to receive image data divided into segments and generate a matrix of transform coefficients corresponding to a segment. The device includes a rate control logic configured to select either the first set of quantization levels or the second set of quantization levels based, at least in part, on the target compression ratio for the image. The rate control logic is further configured to select a quantization level from the selected set of quantization levels based, at least in part, on a desired visual quality. Each quantization level comprises a matrix of divisors to be applied to corresponding transform coefficients in the matrix of transform coefficients. The device includes an encoding logic configured to encode the array of integers as a bit stream.

In one embodiment, the matrix of transform coefficients is arranged with the lowest frequency coefficient in the upper left hand corner. In the one embodiment the first quantization level comprises a first quantization level matrix having a lowest integer value in the upper left hand corner.

In one embodiment, the transform logic performs a wavelet transformation on the segment to generate the matrix of transform coefficients.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

FIG. 2A illustrates example 4×4 matrix of transform coefficients associated with efficient visually lossless compression FIG. 2B illustrates example quantization levels associated with efficient visually lossless compression that may be selected for quantization of an image.

DETAILED DESCRIPTION

Typically, visually lossless compression is performed on each segment (e.g., a small number of pixels) of an image according to a single compression ratio selected for the image. For example, visually lossless methods such as JPEG-LS (M. Weinberger, 2000) and visibility threshold based JPEG2000 visually lossless encoding (H. Oh, 2012) do not have different compression ratios for different image segments or individual memory access. Also, the high efficiency of JPEG-LS and JPEG2000 come from exploitation of correlations among neighboring pixels resulting in complex calculations that consume resources and may even require additional resources such as memory. Most other existing visually lossless methods (D. Vo, 2011) (M. Rani, 2012) (Vitter, 1993) are prediction based. The prediction based visually lossless methods either have specific line memory requirement or need many ad-hoc quantization adjustments. The prediction based visually lossless methods also have reduced compression efficiency.

Described herein are example systems, methods, and other embodiments associated with providing efficient visually lossless compression by including rate control that allows different quantization levels and therefore compression ratios for different segments. The visually lossless compression method has a fixed overall compression ratio and does not degrade the visual quality of images, thereby reducing the memory required to store the images while maintaining the quality of the images for further processing.

An image is divided into segments. The segments are classified as having low frequency variations or high frequency variations. For example, smooth gradations of color may be classified as low frequency variations and sharp transitions in color may be classified as high frequency variations. The segments are quantized according to a quantization level selected from a group of quantization levels. The rate control designates a specific compression ratio for a segment by selecting a specific quantization level for the segment.

Figure 1:
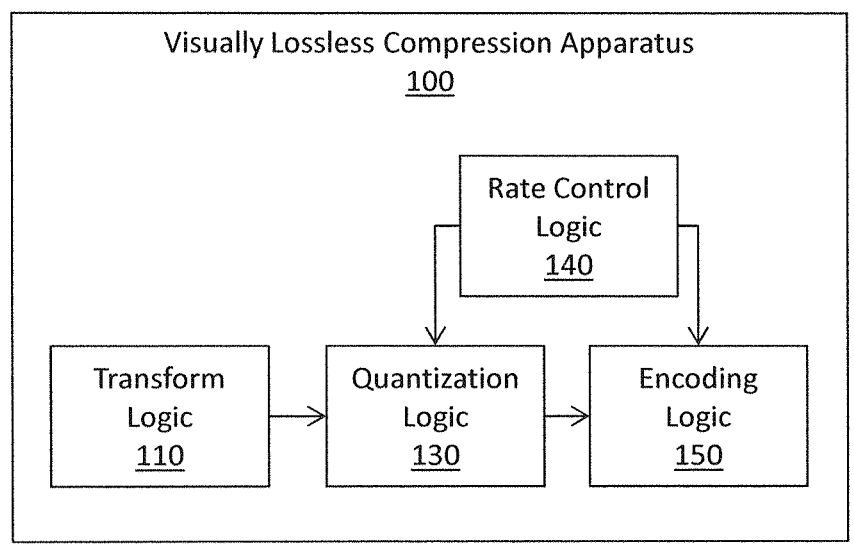
FIG. 1 illustrates one embodiment of an apparatus associated with efficient visually lossless compression and having a rate control logic.

With reference to FIG. 1, one embodiment of an apparatus 100 is shown that is associated with efficient visually lossless compression. The apparatus 100 may be implemented in a non-transitory computer readable medium that includes a transform logic 110, a quantization logic 130, a rate control logic 140, and an encoding logic 150. The transform logic 110 receives segments of data associated with an image. The image may be a visual file (e.g., gif, jpeg, video). In one embodiment, the apparatus 100 receives the image as 16 pixels grouped as a segment and arranged into blocks. The blocks may correspond to channels of a color space. For example, in the YUV color space, the 16 pixel segment may be arranged into two blocks: a first block for the Y channel and second block for the UV channel. Alternatively, the exemplary 16 pixel segment may be arranged into three blocks: a first block in the Y channel, a second block in the U channel, and a third block in the V channel.

The transform logic 110 performs a transform (e.g., reversible 4×4 Harr, discrete cosine transform) on the blocks of the segments. The transform logic 110 generates coefficients corresponding to the frequency of pixel values in the blocks of a segment. The coefficients can be compressed more easily because the information of the pixel values is statistically concentrated into less than all of the coefficients. In one embodiment, a reversible 4×4 Harr wavelet transform is used for a 16 pixel segment because of its low computation complexity. The reversible 4×4 Harr wavelet transform has low calculation complexity because it is an integer operation and does not require division. The transform logic 110 performs the transform in vertical and horizontal directions of the blocks resulting in transform coefficients.

The resulting transform coefficients are arranged in a two dimensional form, such as the matrix shown in FIG. 2A.

Referring to FIG. 2A, matrix 200 represents a 16 pixel segment that has been transformed into 4×4 matrix by the transform logic 110 of FIG. 1. The matrix 200 is comprised of the transform coefficients. In this embodiment, the transform coefficients correspond to letters "A"-"P." The lower-frequency coefficients are arranged in the top-left corner of the matrix and tend to have larger values than higher-frequency coefficients elsewhere. For example, the coefficients corresponding to A, B, and E are larger than the coefficients corresponding to N, O, and P of matrix 200.

Returning to FIG. 1, after the transform logic 110 performs the transform, the energy of a flat area of a segment is normally compacted in the first few coefficients in lower frequency bands. However, for a complex or random area, the energy could spread over all coefficients. Nevertheless, compression can be achieved and high visual quality can be maintained by exploiting the fact that human eyes are more sensitive to the changes of lower-frequency coefficients, and compression errors are less perceptible in complex or random areas than flat areas of the image. Transform coefficients in different frequency bands are tied to different levels of importance to visual quality. The transform coefficients are then quantized to achieve a required compression ratio for the image and to maintain high visual quality.

The rate control logic 140 selects a set of quantization levels to be applied to the image. In one embodiment, the rate control logic 140 first selects a set of quantization levels from a plurality of quantization levels. Multiple sets of quantization levels may be stored for access by the rate control logic 140. Each set of quantization levels corresponds to a different target compression ratio for the image. The sets of quantization levels may be generated experimentally or theoretically. The quantization levels are selected for inclusion in the set of quantization levels based on a target compression ratio for the image.

FIG. 2B illustrates an example set of quantization levels 201-208. In one embodiment, each quantization level corresponds to a different compression ratio. Alternatively, a quantization level may have the same overall compression ratio as another quantization level, however, the two quantization levels may quantize portions of the transform coefficients differently. A quantization level, such as quantization level 201, is a matrix of divisors to be applied to corresponding transform coefficients in the matrix of transform coefficients. The divisors may be integer values that are powers of two. The divisors may include multiple integer values.

The rate control logic 140 determines which quantization level should be used for a particular segment to maximize compression in segments where visual impact will not be affected. In doing so, the rate control logic 140 reduces the system memory bandwidth by specifying different compression ratios for the individual segments. The rate control logic 140 selects a quantization level for a segment based on a desired visual quality associated with the target compression ratio. For example, a quantization level may be chosen based on optimal perceptual thresholds of the human eye. The quantization level may include a number of different bit rates that provide the desired visual quality. In one embodiment, to select a quantization level from the set of quantization levels, the rate control logic 140 starts with the lowest quantization level that minimizes compression and provides the best image quality. The quantization level may also be selected based on the available memory.

The quantization logic 130 quantizes the segment according to the quantization level selected by the rate control logic 140. After quantizing the segment, the quantization logic 130 determines whether a bit budget for that segment is met. The bit budget is set to ensure that the overall image meets the target compression ratio. Accordingly, the bit budget is based on the desired visual quality. Therefore, each segment may have the same bit budget so that when the overall image is compressed, the compressed image only requires a predetermined amount of space to be stored.

For example, segments may have 16 pixels, with 10 bits bit-depth. Such a segment of original data in the YUV4:2:2 color space requires total 40 bytes memory space to be stored uncompressed. If the original data was compressed using a compression ratio of 1.6:1, the required memory space to store the data would be reduced to 25 bytes. If the target compression ratio is 2:1, only 20 bytes memory space would be required to store the original 40 bytes data. A bit budget for each segment may be set to 25 bytes based on the target compression ratio of 1.6:1 for the image.

In this example, the rate control logic 140 would first select a lowest quantization level because the lower the compression ratio the higher the quality of the stored compressed image. The quantization logic 130 quantizes the segment using the selected lowest quantization level and the encoding logic 150 encodes the quantized segment as a bit stream. However, if the number of bytes needed for the resulting bit stream exceeds the bit budget (e.g., 25 bytes), the quantization logic 130 would return to the rate control logic 140 which would progress to the next quantization level. The quantization logic 130 would quantize the segment using the next quantization level and the encoding logic 150 encodes the quantized segment as a bit stream. If the number of bytes needed for the resulting bit stream is less than the bit budget (e.g., 25 bytes), the visually lossless compression apparatus 100 would provide the resulting bit stream to a storage medium.

Returning to FIGS. 2A and 2B, the quantization logic 130 applies the quantization level selected by the rate control logic 140 to the transform coefficients: A-P. When a quantization level is applied to the matrix of transform coefficients, the coefficients of the matrix are divided by the integer value in a corresponding position of the quantization level. For example, if the quantization logic 130 applies quantization level 201 of FIG. 2B to the matrix 200 of FIG. 2A, the coefficients of the matrix 200 are divided by the integer value in the corresponding position of quantization level 201. Therefore, A-D are divided by 1, and E-P are divided by 2. If instead the quantization logic 130 applies quantization level 202, A is divided by 1, B-G are divided by 2, H-J are divided by 4, and K-P are divided by 8. The result is an array of integers corresponding to quotients of transform coefficients and corresponding integer values in the selected quantization level.

The encoding logic 150 employs encoding methods to represent the array of integers in a compressed bit stream. In one embodiment, the array of integers is represented in binary. The fact that the integers of the array of integers have lower values due to being divided by the quantization level allows the array of integers to be represented in fewer binary values than the original transform coefficients. While the visually lossless compression apparatus 100 is described with respect to visually lossless compression, the apparatus 100 may employ alternative compression techniques (e.g., lossy compression, lossless compression).

Figure 3:
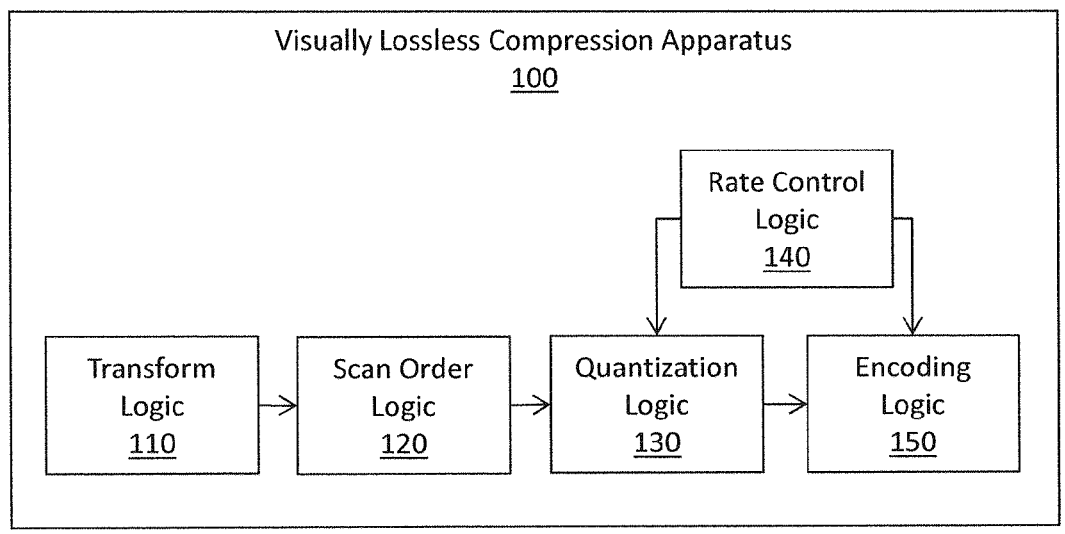
FIG. 3 illustrates one embodiment of an apparatus associated with efficient visually lossless compression and having a scan order logic.

FIG. 3 illustrates one embodiment of an apparatus associated with efficient visually lossless compression that includes a scan order logic 120. The transform logic 110, the quantization logic 130, the rate control logic 140, and the encoding logic 150 operate in the manner described above with respect to FIG. 1.

The transform coefficients are sent by the transform logic 110 to the scan order logic 120. In one embodiment, transform coefficients are reordered after the quantization stage to group together remaining zero coefficients. The scan order logic 120 reorders the coefficients before quantization so that the reordering reflects the order of descending frequency magnitude which corresponds to decreasing impact to visual quality of the image that results from compression. In other words, the higher the frequency of the coefficient, the more the visual quality of the image is degraded by compressing the segment. Thus, transform coefficient matrix value A in FIG. 2A would correspond to the lowest frequency coefficient. The scan order logic may reorder the transform coefficients based on a reorder table (not shown) that is also stored in the encoding logic 150.

Figure 4:
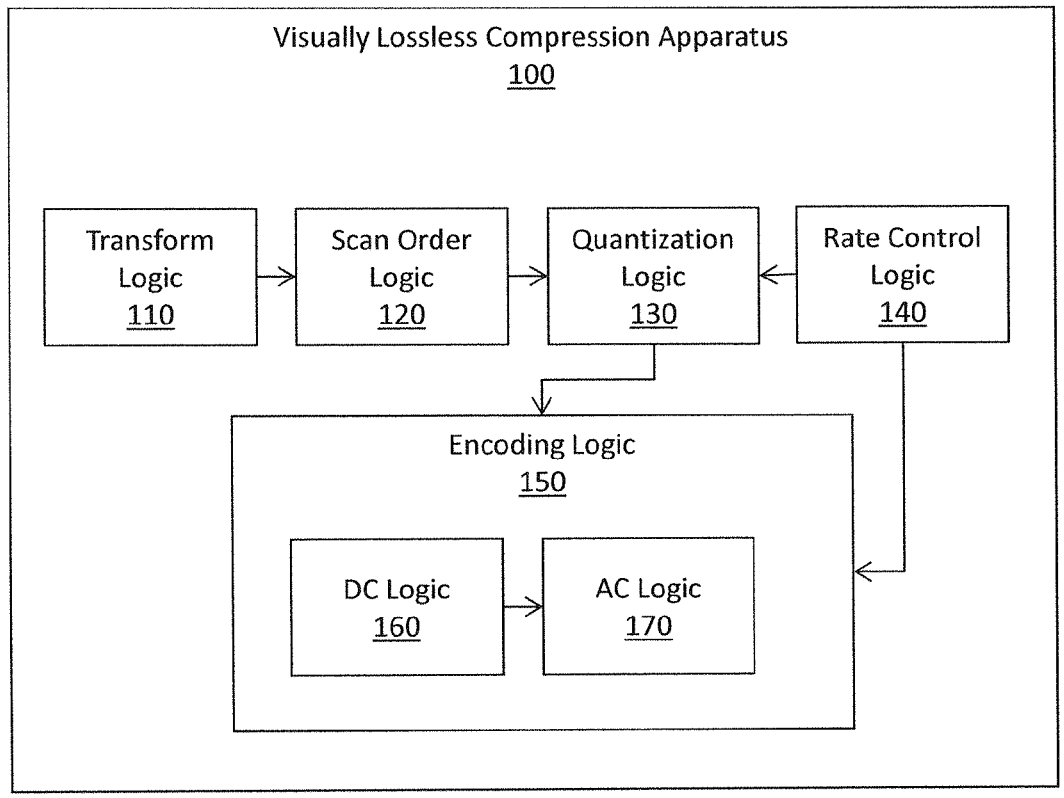
FIG. 4 illustrates one embodiment of an apparatus associated with efficient visually lossless compression and having an encoding logic with a direct current (DC) logic and an alternating current (AC) logic.

FIG. 4 illustrates one embodiment of an apparatus associated with efficient visually lossless compression that includes an encoding logic 150 with a direct current (DC) logic 160 and alternating current (AC) logic 170. The transform logic 110, the scan order logic 120, the quantization logic 130, and the rate control logic 140 operate in the manner described above with respect to FIGS. 1 and 3.

Once the scan order logic 120 reorders the transform coefficients and the reordered transform coefficients have been quantized by the quantization logic 130, the result is an array of integers. The encoding logic 150 encodes the array of integers as a bit stream. The DC logic 160 encodes a DC value to a fixed length bit stream that will be produced by the encoding logic 150 In one embodiment, the blocks are scanned from left to right, row by row. The DC value, which represents the mean value of the image data values (e.g., pixel, pel, picture element), is the first value of the bit stream corresponding to the segment. In one embodiment, the DC coefficient is the average of 4×4 pixel values, and is therefore a positive integer less than 1024.

The remaining values of the bit stream are provided by the AC logic 170. The AC logic 170 accesses a set of small-value friendly variable length coding (VLC) tables to code the quantized array of integers as binary values. The VLC tables are designed based on the sets of quantization levels. Specifically, after being quantized, the array of integers have values that correspond to patterns of identified ranges.

The AC logic 170 selects one of four different AC patterns based on the values of the integers in the array of integers. A first pattern is selected to encode the array of integers output from the quantization logic 130 if the array of integers includes many trailing zeroes. When the first pattern is selected, the encoded bit stream generated by the encoding logic 150 will include a DC value provided by the DC logic 160 and AC values of mainly zeroes provided by the AC logic 170.

A second pattern is selected if the array of integers contains values between −1 and 1. When the second pattern is selected, the encoded bit stream has the DC value provided by the DC logic 160 and AC values corresponding to the VLC Table 1, T1 (shown below), generated by the AC logic 170. For example a 0 in the array of integer is coded by the AC logic 170 as 0 according to the VLC table T1. A 1 is encoded as a 1 with a value s, where s is a binary value indicating the sign of the value 1. For example, a 0 for the s value may indicate −1 and a 1 for the s value may indicate +1.

| Abs(AC) | VLC code | range: [−1, 1] | T1 |
|---------|----------|----------------|-----|
| 0 | 0 | | |
| 1 | 1s | | |

A third pattern is selected if the array of integers contains values between −4 and 4. When the third pattern is selected, the encoded bit stream has the DC value provided by the DC logic 160 and AC values corresponding to the VLC Table 2, T2 (shown below), generated by the AC logic 170. For example a 0 in the array of integer is coded as 00. A 1 is encoded as a 1 with a value s, where s is a binary value indicating the sign of the value 1. For example, a 0 for the s value may indicate −1 and a 1 may indicate +1. A 2 is encoded as 010 with a vale s that indicates sign. And values of 3 or 4 in the array of integers are encoded as 011 with a value x that indicates whether the value is a 3 or a 4. For example, x is a binary value where a 0 indicates that the value is a 3 and 1 indicates that the value is a 4. Again, the s is a binary value indicating the sign of the value whether the value is a −4 or +4.

| Abs(AC) | VLC code | range: [−4, 4] | T2 |
|---------|----------|----------------|-----|
| 0 | 00 | | |
| 1 | 1s | | |
| 2 | 010s | | |
| 3-4 | 011xs | | |

A fourth pattern is selected if the array of integers contains a large range of values. In one embodiment, the AC logic 170 determines the range of values in the array of integers. For example, if the array of integers has values between −1023 and 1023, the AC logic 170 encodes the array of integers according to a VLC table, T3, shown below. The array of integers is encoded by the AC logic 170 using the values of x and s used in the same manner as VLC table 2, T2, shown above. For example, values between 2 and 5 are encoded using two binary values for x that indicate 2, 3, 4, or 5 such that 2 may be coded as 00, 3 as 01, 4 as 10, and 5 as 11. The sign of the 2, 3, 4, or 5 is coded using the s value.

| Abs(AC) | VLC code | range: [−1023, 1023] | T3 |
|---------|----------|----------------------|-----|
| 0 | 000 | | |
| 1 | 001s | | |
| 2-5 | 01xxs | | |
| 6-9 | 100xxs | | |
| 10-17 | 101xxxs | | |
| 18-33 | 110xxxxs | | |
| 34-65 | 1110xxxxxs | | |
| 66-129 | 11110xxxxxxs | | |
| 130-1023 | 11111xxxxxxxxxxs | | |

If instead the array of integers has values between −31 and 31, VLC table 4, T4, shown below is used by the AC logic 170 to encode the values in a similar manner as described above with respect to VLC tables T1, T2, and T3.

| Abs(AC) | VLC code | range: [−31, 31] | T4 |
|---------|----------|------------------|-----|
| 0 | 1 | | |
| 1-2 | 00xs | | |
| 3-4 | 010xs | | |
| 5-8 | 0110xxs | | |
| 9-16 | 01110xxxs | | |
| 17-31 | 01111xxxxs | | |

Alternatively, if the array of integers has values between 0 and 15, VLC table 5, T5, shown below is used to encode the values in a similar manner as described above with respect to VLC tables T1, T2, T3, and T4. The VLC tables shown are exemplary. More or fewer VLC tables may be used by the AC logic 170 to encode the remainder of the bit stream from the array of integers provided by the quantization logic 130.

| Abs(AC) | VLC code | range: [0, 15] | T5 |
|---------|----------|----------------|-----|
| 0 | 0 | | |
| 1-4 | 10xx | | |
| 5-8 | 110xx | | |
| 9-15 | 111xxx | | |

The encoding logic 150 employs the DC logic 160 to code a DC value using fixed length coding based on the quantization levels selected by the quantization logic 130. The remaining values of the bit stream are provided by the AC logic 170. In one embodiment DC coefficient is the average of 4×4 pixel values, and is therefore, a positive integer less than 1024 (10 bit). Once the quantization level is determined, the maximum value of each quantized DC can be determined. For example, if quantization level 207 (shown in FIG. 2B) is selected, 7 bits are needed to code the quantized DC value. To achieve AC pattern 4 with AC coefficients that are fairly random, the remaining six elements are quantized using VLC table 4, T4 (shown above).

Figure 5:
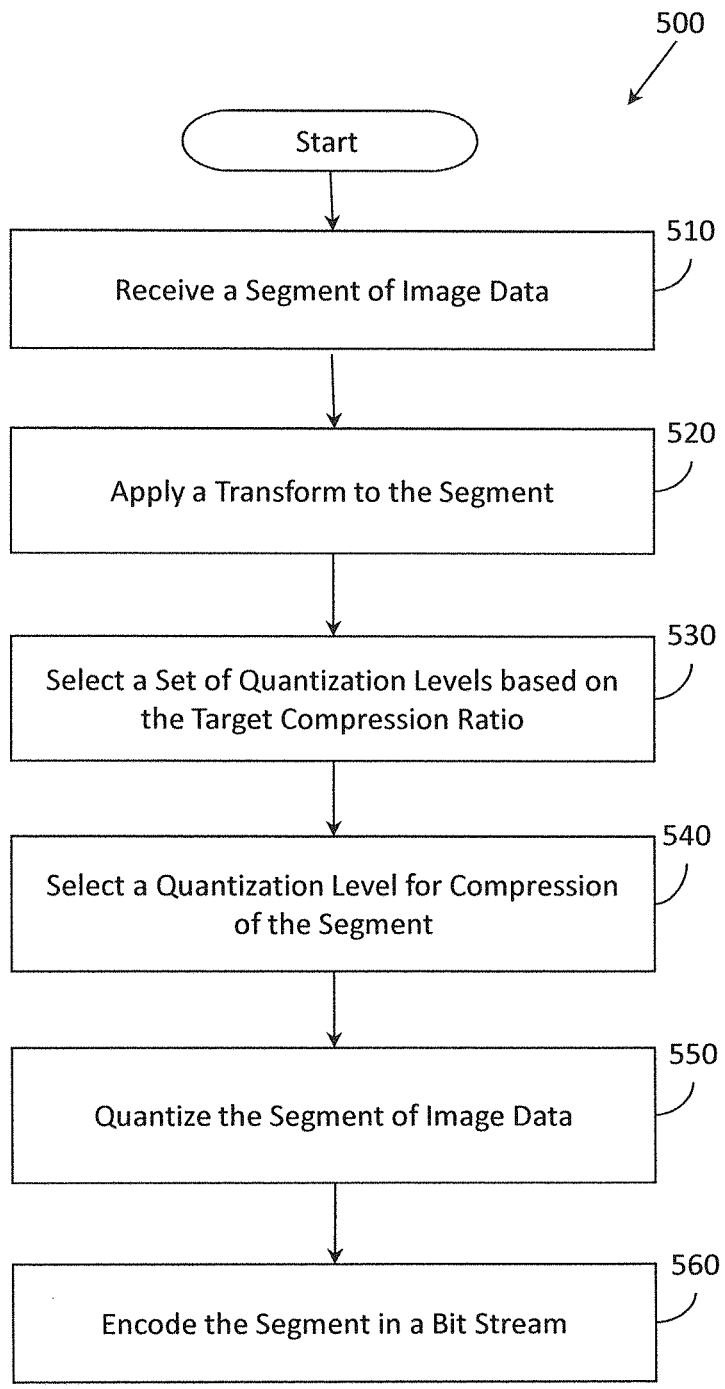
FIG. 5 illustrates one embodiment of a method associated with efficient visually lossless compression employing rate control of individual segments.

FIG. 5 illustrates one embodiment of a method associated with efficient visually lossless compression employing rate control of individual segments. At 510, a segment of image data is received. The segment may be defined as a predetermined number of pixels representing an image. At 520, a transform is applied to the segment. In one embodiment the transform may be represented by: (a, b, c, d)→([a+b+c+d+2]>>2, [a+b-c-d]>>1, [a-b], [c-d]).

Correspondingly, the inverse transform is:

$$(x,y,z,p) \rightarrow ([x-(\{((z+p)>>1)*2-y*2-z*3-p+2\}>>2)],$$
$$[x-(\{((z+p)>>1)*2-y*2-z*3-p+2\}>>2)-z], [x-(\{((z+p)>>1)*2-y*2-z*3-p+2\}>>2)+((z+p)>>1)*2-y-z], [x-(\{((z+p)>>1)*2-y*2-z*3-p+2\}>>2)+((z+p)>>1)*2-y-z-p]).$$

For example, the original data may be represented in a matrix:

$$\begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix}$$

By applying the given transform, the transform coefficients may be represented in the matrix:

$$\begin{bmatrix} \left(\sum_{j=0}^{3}\sum_{i=0}^{3} a_{ji}\right)/16 & \left(\sum_{j=0}^{3}\sum_{i=0}^{1} a_{ji} - \sum_{j=0}^{3}\sum_{i=2}^{3} a_{ji}\right)/8 & \left(\sum_{j=0}^{3} a_{j0} - \sum_{j=0}^{3} a_{j1}\right)/4 & \left(\sum_{j=0}^{3} a_{j2} - \sum_{j=0}^{3} a_{j3}\right)/4 \\ \left(\sum_{j=0}^{1}\sum_{i=0}^{3} a_{ji} - \sum_{j=2}^{3}\sum_{i=0}^{3} a_{ji}\right)/8 & \left(\sum_{j=0}^{1}\sum_{i=0}^{1} a_{ji} + \sum_{j=2}^{3}\sum_{i=2}^{3} a_{ji} - \sum_{j=0}^{1}\sum_{i=2}^{3} a_{ji} - \sum_{j=2}^{3}\sum_{i=0}^{1} a_{ji}\right)/4 & \left(\sum_{j=0}^{1} a_{j0} + \sum_{j=2}^{3} a_{j1} - \sum_{j=0}^{1} a_{j1} - \sum_{j=2}^{3} a_{j0}\right)/2 & \left(\sum_{j=0}^{1} a_{j2} + \sum_{j=2}^{3} a_{j3} - \sum_{j=0}^{1} a_{j3} - \sum_{j=2}^{3} a_{j2}\right)/2 \\ \left(\sum_{i=0}^{3} a_{0i} - \sum_{i=0}^{3} a_{1i}\right)/4 & \left(\sum_{i=0}^{1} a_{0i} + \sum_{i=2}^{3} a_{1i} - \sum_{i=2}^{3} a_{0i} - \sum_{i=0}^{1} a_{1i}\right)/2 & a_{00} + a_{11} - a_{01} - a_{10} & a_{02} + a_{13} - a_{03} - a_{12} \\ \left(\sum_{i=0}^{3} a_{2i} - \sum_{i=0}^{3} a_{3i}\right)/4 & \left(\sum_{i=0}^{1} a_{2i} + \sum_{i=2}^{3} a_{3i} - \sum_{i=2}^{3} a_{2i} - \sum_{i=0}^{1} a_{3i}\right)/2 & a_{20} + a_{31} - a_{21} - a_{30} & a_{22} + a_{33} - a_{23} - a_{32} \end{bmatrix}$$

At 530, a set of quantization levels is selected based on the target compression ratio for an image. The set of quantization levels may be selected from a number of sets of quantization levels based on the target compression ratio for the overall image. The quantization levels in a set represent increasing compression ratios that have inversely proportional image quality. At 540, a quantization level is selected from the set of quantization levels. The selected quantization level determines the compression ratio for the segment. At 550, the matrix is quantized according to the selected quantization level resulting in an array of integers. The quantized array of integers is encoded at 560 as a variable length bit stream within a target bit budget.

Figure 6:
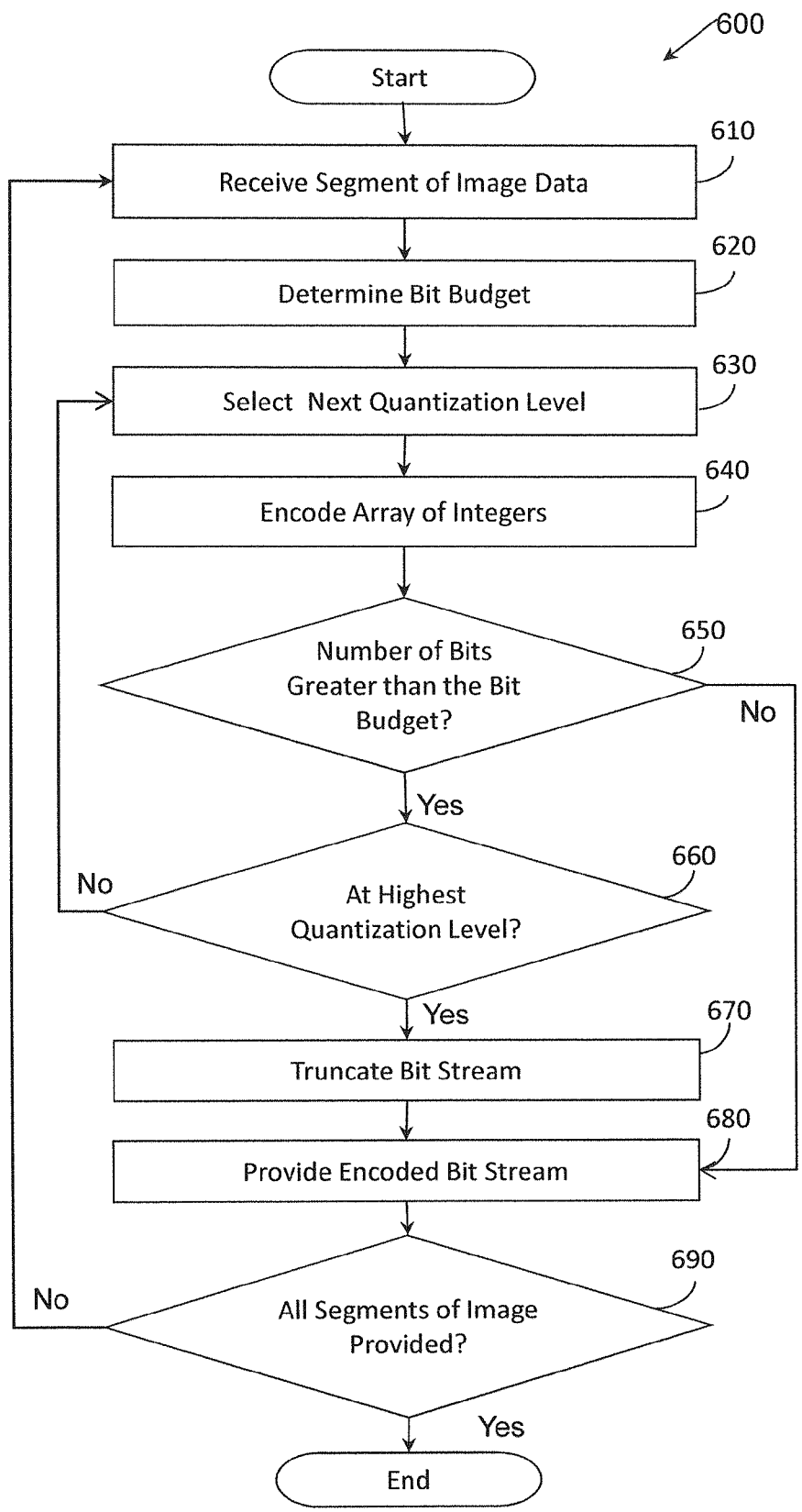
FIG. 6 illustrates one embodiment of a method associated with efficient visually lossless compression employing fixed length encoding of bits in a bit stream.

FIG. 6 illustrates one embodiment of a method associated with efficient visually lossless compression employing variable length encoding of bits in a bit stream. At 610, a segment of image data is received as a matrix of transform coefficients. At 620, a bit budget for the segment is determined. The bit budget is set such that a resulting compressed image will not exceed the allocated space on the memory or media storing that compressed image. The bit budget may be based on the amount of storage (e.g. memory space, disk space, media) or the desired image quality. In one embodiment, the segments of an image each have the same bit budget to ensure that the target compression ratio of the overall image is met. In another embodiment, the segments of the image may be prioritized and higher priority segments may be given a larger bit budget.

At 630, a quantization level for the segment is selected from a set of quantization levels. In the example shown in FIG. 2B, the quantization is selected from a set of eight quantization levels. Each different quantization level corresponds to a different compression ratio. In one embodiment, the quantization level having the lowest compression ratio (e.g., quantization level 201 in FIG. 2B) is selected first. At 640, an array of integers corresponding to the quotient of the transform coefficients and the selected quantization level is encoded in a bit stream.

At 650, it is determined whether the number of bits in the bit stream is greater than the bit budget. If the number of bits in the bit stream does not exceed the bit budget, then the method continues to 680. At 680, the bit stream corresponding to the segment that has been quantized according to the selected quantization level and encoded is provided to a storage media. If the number of bits in the bit stream does exceed the bit budget, then the method continues to 660.

At 660, it is determined whether the selected quantization level has the highest compression ratio of the quantization levels in the set of quantization levels. If, at 660, it is determined that the selected quantization level does not have the highest compression ratio of the quantization levels in the set of quantization levels, the method 600 returns to 630 and the next quantization level with an incrementally higher compression ratio is selected. If the selected quantization level does correspond to the highest compression ratio of the quantization levels in the set of quantization levels, the method 600 continues to 670. At 670, the bit stream is truncated. The bit stream is truncated because the selected quantization level has the highest compression ratio available and the number of bits required still exceeds the bit budget, so a remaining option is to truncate the bit stream. At 680, the truncated bit stream is provided to the storage media.

At 690, it is determined whether all of the segments that comprise an image have been quantized, encoded, and provided to the storage medium. If all of the segments comprising the image have quantized and encoded, the method is finished. If there is at least one segment of image data that has not yet been quantized or encoded, the method returns to 610 and a remaining segment of image data is received.

Figure 7:
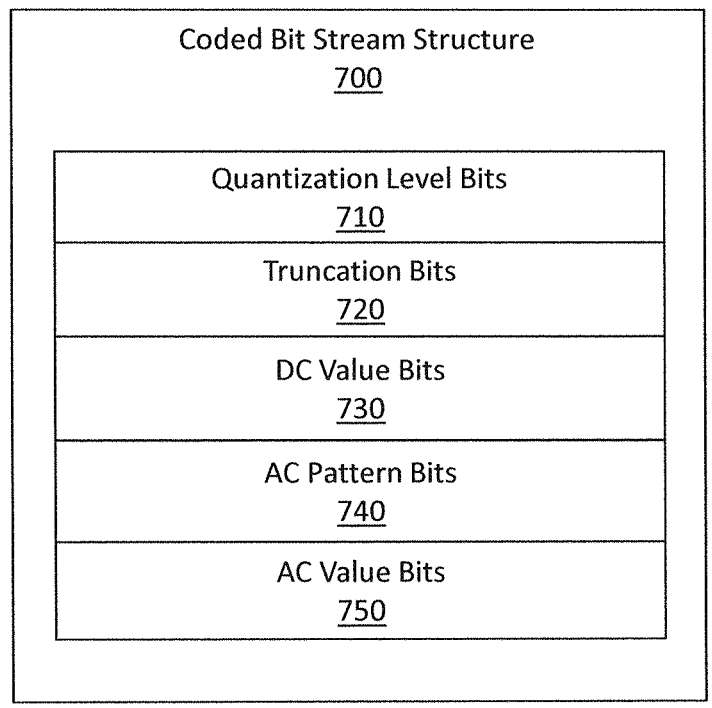
FIG. 7 illustrates an example of a coded bit stream structure associated with efficient visually lossless compression.

FIG. 7 illustrates an example of a coded bit stream structure associated with efficient visually lossless compression that may be output by the encoding logic 150 of FIG. 1. The coded bit stream structure 700 includes quantization level bits 710. The quantization level bits 710 are a fixed bit length that designate the selected quantization level for a segment of image data (e.g., 201 if the first quantization level in FIG. 2B was used to quantize the segment). In one embodiment, three bits designate the selected quantization level.

The coded bit stream structure 700 also includes a truncation bit 720. The truncation bit is a binary bit that indicates whether the bit stream has been truncated. In one embodiment, the bit stream is truncated if at the highest compression level the number of bits required to compress a segment exceeds a bit budget.

The coded bit stream structure 700 also includes bits that result from encoding the segment. For example, DC value bits 730 are from a fixed length coding of a quantized DC value. AC pattern bits 740 identify the AC pattern of the segment. In one embodiment, two bits are used to designate the AC pattern. AC values 750 are the encoded according to a VLC table corresponding to the AC pattern (e.g., one of the four patterns selected by AC logic 170 discussed with respect to FIG. 4).

The coded bit structure 700 can be decoded according to the selected quantization level encoded in the quantization level bits 710. Also if the truncation bit 720 indicated that the coded bit structure 700 has been truncated, the total number of bits needed for decoding the segment should be equivalent to the bit budget described with respect to FIG. 1. Many possible quantized coefficients are decoded based on the bit stream. Any remaining un-decodable bits are discarded and the rest of the coefficients are set to zero.

Figure 8:
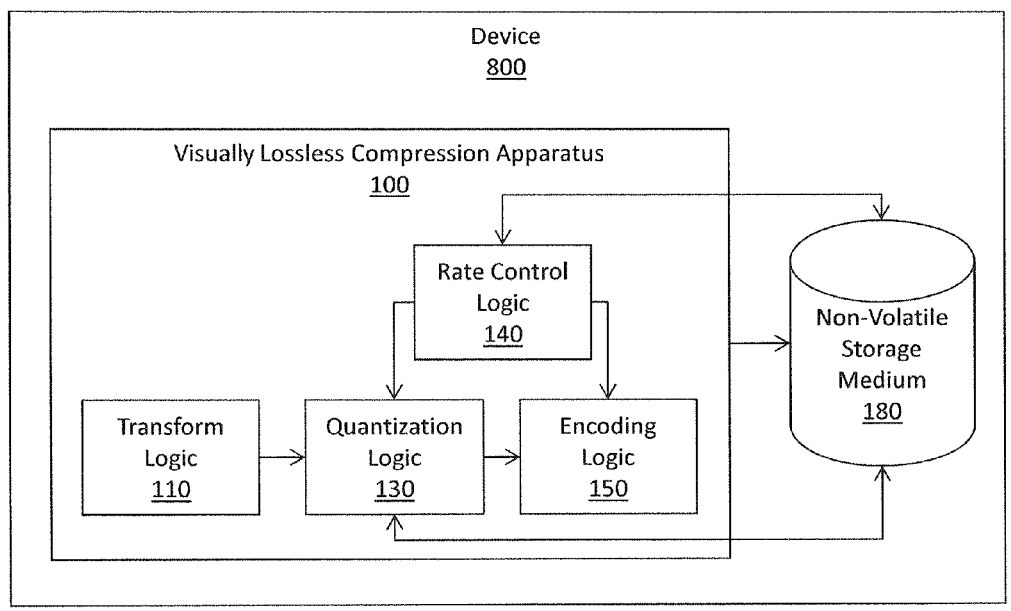
FIG. 8 illustrates one embodiment of a device associated with efficient visually lossless compression that includes a non-volatile storage medium.

FIG. 8 illustrates one embodiment of a device 800 associated with efficient visually lossless compression that includes a non-volatile storage medium 180. The transform logic 110, the quantization logic 130, the rate control logic 140, and the encoding logic 150 operate in the manner described above with respect to FIG. 1.

The quantization logic 130 selects a set of quantization levels from a plurality of sets stored on the non-volatile storage medium 180. The quantization logic 130 selects a set from the different sets of quantization levels based on the target compression ratio for the overall image. Once the set of quantization levels has been selected by the quantization logic 130, the rate control logic 140 selects a level from the set of quantization levels to quantize a segment. Each quantization level corresponds to a different compression ratio. The quantization level may initially be selected by the rate control logic 140 because it has the lowest compression ratio of the quantization levels in the set of quantization levels. If the quantization logic 130 determines that the selected quantization level will not satisfy a bit budget for the segment, the next quantization level having an incrementally higher compression ratio than the previous quantization level is selected by the rate control logic 140. Quantization levels are iteratively selected by the rate control logic 140 until the bit budget is satisfied. Once a quantization level resulting in an encoded bit stream meeting the bit budget is selected and the bit stream is encoded by the encoding logic 150, the bit stream is stored in the non-volatile storage medium 180.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods described with respect to FIGS. 1-8.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logics described herein are limited to statutory subject matter under 35 U.S.C §101.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a transform logic configured to receive image data divided into segments and generate a matrix of transform coefficients corresponding to a segment;
a rate control logic configured to select:
a set of quantization levels from a plurality of sets of quantization levels; wherein each set of quantization levels corresponds to a different target compression ratio for the image data; and
a quantization level from the selected set of quantization levels based, at least in part, on a desired visual quality, wherein a quantization level comprises a matrix of divisors to be applied to corresponding transform coefficients in the matrix of transform coefficients;
a quantization logic configured to quantize the matrix of transform coefficients according to the selected quantization level to produce an array of integers; and
an encoding logic configured to encode the array of integers as a bit stream.

2. The apparatus of claim 1, further comprising a scan order logic configured to reorder the transform coefficients before the matrix of transform coefficients is quantized to place the transform coefficients in order of decreasing impact to visual quality of the image data.

3. The apparatus of claim 1, wherein the divisors are integer values that are powers of two, and wherein the divisors are comprised of at least two different integer values.

4. The apparatus of claim 1, wherein:
the quantization logic is further configured to receive a bit budget for the segment, wherein the bit budget is based, at least in part, on the desired visual quality; and
the rate control logic is further configured to iteratively select different quantization levels until the number of bits in the bit stream does not exceed the bit budget.

5. The apparatus of claim 1, wherein the encoding logic includes a direct current (DC) logic configured to encode, as a first bit in the bit stream, a fixed bit value representing a mean value of values in the array of integers.

6. The apparatus of claim 1, wherein the encoding logic includes an alternating current (AC) logic configured to encode values in the array of integers according to variable length coding tables.

7. The apparatus of claim 1, wherein the transform logic is configured to perform a wavelet transformation on the segment to generate the matrix of transform coefficients.

8. A method, comprising:
generating, as data stored in a non-transitory computer-readable medium, a matrix of transform coefficients by applying a transform to a segment of image data;
selecting a set of quantization levels from a plurality of sets of quantization levels based, at least in part, on a target compression ratio for the image data;
selecting a quantization level from the selected set of quantization levels based, at least in part, on a desired visual quality, wherein each quantization level comprises a matrix of divisors to be applied to corresponding transform coefficients in the matrix of transform coefficients;
quantizing the matrix of transform coefficients according to the selected quantization level for the segment by applying the divisors in the selected quantization level to the transform coefficients to produce an array of integers; and
encoding the array of integers as a bit stream in at least a data structure.

9. The method of claim 8, further comprising:
reordering transform coefficients of the matrix of transform coefficients before the matrix of transform coefficients is quantized to place the transform coefficients in order of decreasing impact to visual quality of the image data.

10. The method of claim 8, further comprising:
determining whether the bit stream exceeds a bit budget, wherein the bit budget is based, at least in part, on the desired visual quality; and
selecting a next quantization level having a higher compression ratio for the segment when the bit stream exceeds the bit budget.

11. The method of claim 10, further comprising:
truncating the bit stream to meet the bit budget when the bit stream exceeds the bit budget and the selected quantization level represents the highest compression ratio.

12. The method of claim 10, wherein the bit budget is set so that a resulting compressed image will not exceed an allocated space on a memory.

13. The method of claim 8, wherein the divisors are integer values that are powers of two, and wherein the divisors are comprised of at least two different integer values.

14. The method of claim 8, wherein the bit stream includes quantization level bits representing the selected quantization level, DC bits, and AC bits.

15. A device, comprising:
a non-volatile storage medium having stored thereon at least a first set of quantization levels and a second set of quantization levels, wherein each set of quantization levels comprises at least one quantization level, and wherein each set of quantization levels corresponds to a target compression ratio for an image;
a transform logic configured to receive image data divided into segments and generate a matrix of transform coefficients corresponding to a segment;
a rate control logic configured to select:

the first set of quantization levels or the second set of quantization levels based, at least in part, on the target compression ratio for the image; and a quantization level from the selected set of quantization levels based, at least in part, on a desired visual quality, where a quantization level comprises a matrix of divisors to be applied to corresponding transform coefficients in the matrix of transform coefficients;

a quantization logic configured to quantize the matrix of transform coefficients according to the selected quantization level to produce an array of integers; and an encoding logic configured to encode the array of integers as a bit stream.

16. The device of claim 15, wherein the matrix of transform coefficients is arranged with the lowest frequency coefficient in an upper left hand corner, and further wherein a first quantization level comprises a first quantization level matrix having a lowest integer value in an upper left hand corner.

17. The device of claim 16, wherein a second quantization level comprises a second quantization level matrix having at least one integer value that is higher than integer values of the first quantization level matrix.

18. The device of claim 15, wherein a first quantization level has a lower compression ratio than a second quantization level.

19. The device of claim 15, wherein the matrix of an image segment has been transformed by a wavelet transform.

20. The device of claim 15, wherein a bit budget is set so that a resulting compressed image will not exceed an allotted amount of memory, wherein the bit budget is based, at least in part, on the desired visual quality.

\* \* \* \* \*